(12) United States Patent
Amoros et al.

(10) Patent No.: US 12,500,896 B2
(45) Date of Patent: Dec. 16, 2025

(54) OFFLINE SCRIPTING FOR REMOTE FILE MANAGEMENT

(71) Applicant: Giesecke+Devrient Mobile Security Germany GmbH, Munich (DE)

(72) Inventors: Luis Miguel Amoros, Barcelona (ES); Jordi Monter Prat, Dulles, VA (US)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 435 days.

(21) Appl. No.: 17/213,658

(22) Filed: Mar. 26, 2021

(65) Prior Publication Data
US 2021/0306347 A1 Sep. 30, 2021

Related U.S. Application Data

(60) Provisional application No. 63/000,984, filed on Mar. 27, 2020.

(51) Int. Cl.
*H04L 29/06* (2006.01)
*G06F 16/182* (2019.01)
*H04L 9/40* (2022.01)

(52) U.S. Cl.
CPC .......... *H04L 63/105* (2013.01); *G06F 16/183* (2019.01); *H04L 63/0823* (2013.01); *H04L 63/0869* (2013.01)

(58) Field of Classification Search
CPC .............. H04L 63/105; H04L 63/0823; H04L 63/0869; G06F 16/183
See application file for complete search history.

(56) References Cited

U.S. PATENT DOCUMENTS

| | | | |
|---|---|---|---|
| 2010/0178945 A1* | 7/2010 | Millet | G06Q 20/341 455/466 |
| 2012/0190354 A1* | 7/2012 | Merrien | H04L 63/083 455/422.1 |

(Continued)

OTHER PUBLICATIONS

GlobalPlatform Technology Secure Channel Protocol '11' Card Specification v2.3—Amendment F, Version 1.2, Jul. 2018, pp. 1-62. (Year: 2018).*

(Continued)

*Primary Examiner* — Luu T Pham
*Assistant Examiner* — Fahimeh Mohammadi
(74) *Attorney, Agent, or Firm* — Workman Nydegger

(57) ABSTRACT

Methods, devices and systems are provided for performing remote file management (RFM) operations at a secure element (SE). A secure file update script is received at an OfflineRFMAgent, located within the SE, from an off-card entity (OCE). The secure file update script has been generated offline by an SE issuer managing the OCE, using a decentralized remote file management (DRFM) platform and comprises a plurality of remote management commands for carrying out file management operations on the SE. In a further step, a security level authentication between the OCE and SE based on the secure file update script is performed. If the security level authentication is successful, in a subsequent step a secure channel session between the OCE and the SE is established through the OfflineRFMAgent. Finally, the plurality of remote management commands is processed to remotely manage a file system on the SE.

20 Claims, 6 Drawing Sheets

(56) References Cited

U.S. PATENT DOCUMENTS

| | | | | |
|---|---|---|---|---|
| 2013/0109308 A1* | 5/2013 | Singh | | H04W 4/50 |
| | | | | 455/41.1 |
| 2014/0024343 A1* | 1/2014 | Bradley | | H04W 12/06 |
| | | | | 455/411 |
| 2014/0031024 A1* | 1/2014 | Xie | | G06Q 20/36 |
| | | | | 455/418 |
| 2017/0013442 A1* | 1/2017 | Li | | H04W 8/20 |
| 2017/0099285 A1* | 4/2017 | Ziat | | H04W 12/08 |
| 2017/0245137 A1* | 8/2017 | Cho | | H04W 8/28 |
| 2017/0289115 A1* | 10/2017 | Lessiak | | H04W 12/35 |
| 2019/0121797 A1* | 4/2019 | Dumoulin | | H04W 8/20 |
| 2019/0208407 A1* | 7/2019 | Ding | | H04W 8/205 |
| 2019/0327236 A1* | 10/2019 | Ahuja | | H04L 9/0894 |
| 2020/0128390 A1* | 4/2020 | Lee | | H04W 12/35 |
| 2021/0153166 A1* | 5/2021 | Kamat | | H04W 8/183 |
| 2021/0219138 A1* | 7/2021 | Comarmond | | H04W 8/205 |

OTHER PUBLICATIONS

Security and Trust Services API (SATSA) for Java™ 2 Platform, Micro Edition, Version 1.0, Release: Jul. 28, 2004, pp. 1-214. (Year: 2004).*

Wu Zhou et al., AlwaysUp-to-date-ScalableOfflinePatchingofVM ImagesinaComputeCloud, Dec. 6, 2010, ACM, pp. 377-386. (Year: 2010).*

Charles P. Wright et al., Extending ACID Semantics to the File System, Jun. 1, 2007, ACM, vol. 3, Issue 2, pp. 1-42. (Year: 2007).*

Laurent Bobelin et al., An Autonomic Cloud Management System for Enforcing Security and Assurance Properties, Jun. 16, 2015, ACM, pp. 1-8. (Year: 2015).*

Gregory Linklater et al., Toward Distributed Key Management for Offline Authentication, Sep. 26, 2018, ACM, pp. 10-19. (Year: 2018).*

* cited by examiner

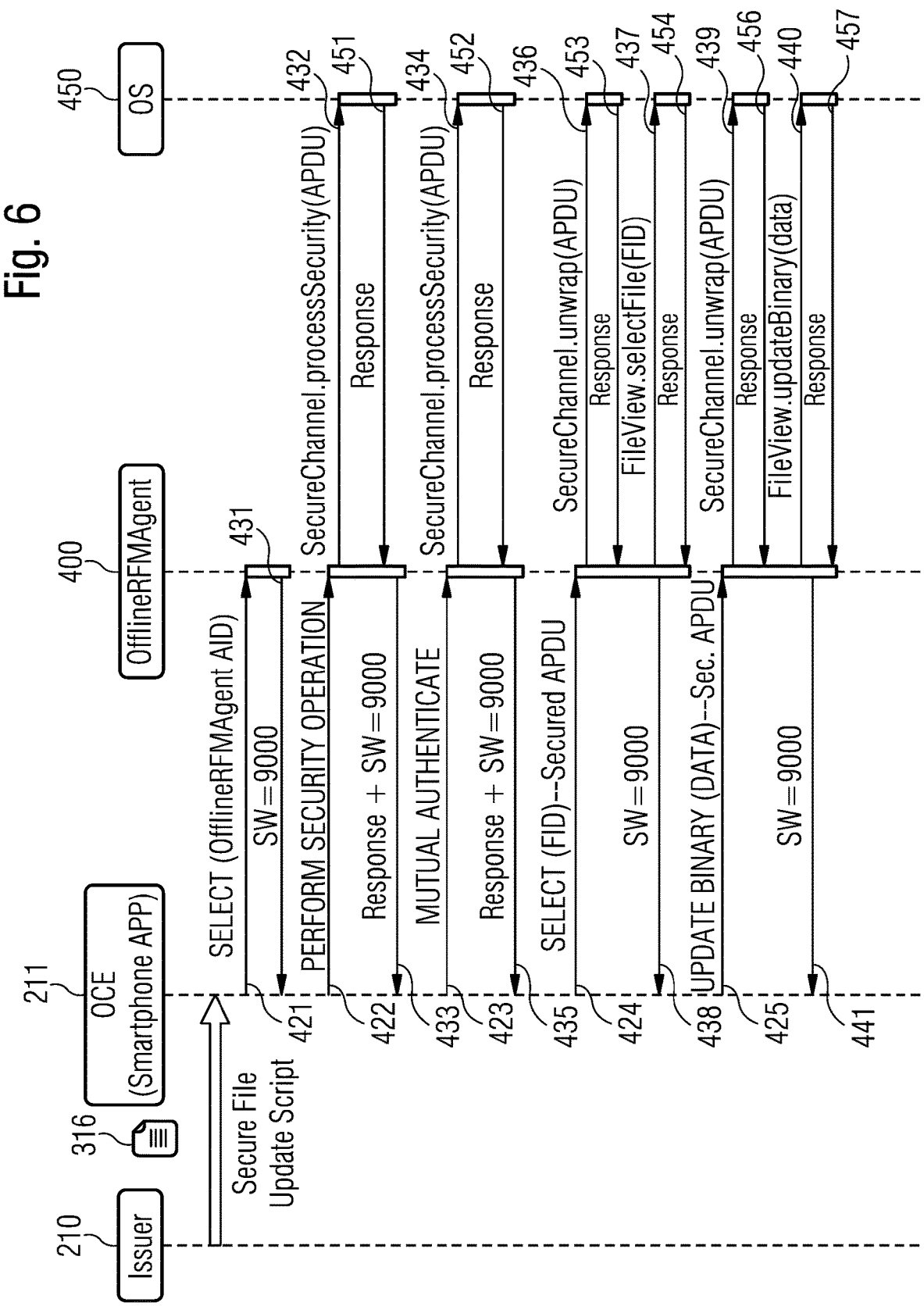

OFFLINE SCRIPTING FOR REMOTE FILE MANAGEMENT

The present invention relates to mobile communications in general and in particular to methods and devices for offline creation of Remote File Management scripts for subscription management of mobile terminals comprising a secure element, such as a subscriber identity module (SIM), a Universal Integrated Circuit Card (UICC), or the like.

BACKGROUND OF THE INVENTION

Communicating by means of a mobile terminal, such as a mobile phone, via a public land mobile network (PLMN; also referred to herein as a mobile or cellular communications network) operated by a mobile network operator (MNO) generally requires the mobile terminal to be equipped with a secure element (SE) for securely storing data uniquely identifying the user (also called subscriber) of the mobile terminal. The secure element basically is a microprocessor chip, which can store sensitive data and run secure applications, such as payment, transit, or telecommunication applications.

In the context of a mobile terminal configured to communicate according to the Global System for Mobile Communications (GSM), the secure element is called a Subscriber Identity Module (SIM) or a Universal Integrated Circuit Card (UICC) and is usually provided in the form of a smart card. As specified in the GSM standard, the SIM contains subscriber credentials for authenticating and identifying the user of the mobile terminal, including in particular an International Mobile Subscriber Identity (IMSI) and an authentication key. These subscriber credentials (IMSI and related keys) are generally stored on the SIM by the SIM manufacturer/vendor or the MNO during a SIM personalization process prior to providing the user of the mobile terminal with his SIM. The subscription credentials are used to identify and authenticate subscribers on mobile terminals to attach to a MNO network.

FIG. 1 illustrates an example of a SIM/UICC file system structure 100 which complies with the ETSI 102 221 V11.0.0 Standard Specification for Smart Cards. The file system resides in the EEPROM of the smart card and comprises a Master File (MF) 110, which is the root of the file system, a plurality of Dedicated Files (DFs) or Directories 122, and Elementary Files (EFs) 121. An Application DF (ADF) 120 is a particular DF that contains all the DFs and EFs of an application.

Similarly to the file system, a secure element can contain secure applications which might be intended for multiple use cases such as building access control, transport ticketing or payment schemes.

One particular field of application of secure elements is M2M (machine-to-machine) communication, i.e. the communication between machines over a cellular communications network without human intervention. In M2M communication data is automatically transmitted between many different types of machines equipped with a secure element in the form of a M2M module, such as TV systems, set top boxes, vending machines, vehicles, traffic lights, surveillance cameras, sensor devices, and the like. M2M devices can be provided with an embedded Universal Integrated Circuit Card (eUICC). The eUICC performs similar functions to those performed by a Subscriber Identity Module (SIM) card in a personal wireless device. The eUICC, however, is not so easy to remove as it is embedded in the device, being soldered, for example, onto a circuit board of the device.

For some of these devices it is not possible or at least very difficult to provide the secure element beforehand with the necessary subscription credentials, including for instance an IMSI, since the secure element will most likely be implemented in the form of a surface mounted chip. Consequently, once deployed in the field, these devices and their non-personalized secure elements require the provision of subscription credentials over-the-air.

Over-The-Air (OTA) is a technology that allows the SE issuer (or owner of the SE) to update or change data in the SEs without having to reissue new samples. In particular, OTA technology provides functionalities for updating the directory and files of SIM/UICC/eUICC cards (Remote File Management, RFM) and for managing applications on the SE (Remote Application Management, RAM).

The Global Platform Card Technology Specification sets up a global standard for cards and/or secure elements issuers that shall be implemented on smart cards. Therein, a Secure Channel Protocol (SCP) is defined as a communication mechanism between an off-card entity (OCE), which may be managed by an SE issuer, and a card (or SE) that provides a certain level of assurance to one or both entities. A new secure channel protocol, named Secure Channel Protocol '11' (SCP11), based on Elliptic Curve Cryptography (ECC) for mutual authentication and secure channel initiation has recently been introduced in the GlobalPlatform Technology Secure Channel Protocol '11' Card Specification.

Different kinds of Secure Channel Protocols (SCP) are defined in the GlobalPlatform Specification, namely based on authentication with Symmetric Cryptography and authentication with Asymmetric Cryptography. In the first case, an authenticated off-card entity is the entity which knows the secret Secure Channel keys needed to initiate a Secure Channel Session. For instance, SCP02 based on DES (considered as deprecated), SCP03 based on AES or SCP80 based on DES or AES which is one of the most common SCP used for OTA operations. In case of authentication with Asymmetric Cryptography, any off-card entity that owns a pair of asymmetric keys and obtained a certificate for its public key certified by an authority recognized by the SE can be successfully authenticated. Protocols following this kind of authentication include, for instance, SCP10 based on RSA, or SCP11 based on ECC. SCP11 has three different variants aimed for different purposes. SCP11a provides mutual authentication between the off-card entity (OCE) and the card. SCP11b provides authentication of the card to the OCE only. SCP11c, also called Decentralized Secure Element Management (DSEM), provides mutual authentication between the OCE and the card, using only static keys for the authentication of the card.

In general, SCP11 and its variants are intended for Card Content Management as defined by GlobalPlatform, such as installation of new application on the SE, updating application content, etc. All of them are based in Elliptic Curve Key Agreement Algorithm (ECKA) as defined in BSI TR-03111 "BSI Technical Guideline TR-03111: Elliptic Curve Cryptography", V2.0. Each variant is using different schemes as per specifications NIST 800-56A "Recommendation for Pair-Wise Key-Establishment Schemes Using Discrete Logarithm Cryptography", Revision 2.

Existing RFM solutions defined in the current standards have some constraints which imply considerable economic costs in order to build and setup OTA-based solutions. A complex key management system must be provided to manage individual SE keys in a secure manner. As a consequence of the Secure Channel Protocols (SCP) involved in the end-to-end secure communication between OTA platform and SE, individual OTA scripts shall be generated for each SE. This is not only because of individual keys but also because other SCP parameters, such as an SCP80 OTA counter, which might be different depending on the SE state. Thus, the scripts provided by the SE issuers to update the SEs are individual OTA scripts, since the same script can only be executed once by one single SE and cannot be reused by any other SE. Furthermore, an online OTA platform must be set up and deployed with a specific assured availability (e.g. 99.997%) to attend the multiple requests.

It is therefore desirable to provide a solution which will enable the SE issuer and/or the off-card entity (OCE) to remotely update an SE file system without the need of an online OTA Platform system and which allows the SE issuer/OCE to send the same script to several SEs.

SUMMARY OF THE INVENTION

According to a first aspect of the present invention, there is provided a method for performing remote file management (RFM) operations at a secure element (SE) by an agent (OfflineRFMAgent), the OfflineRFMAgent being located within the SE. The method comprises in a step receiving from an off-card entity (OCE) a secure file update script comprising a plurality of remote management commands for carrying out file management operations on the secure element. In a further step, a security level authentication of the OCE with the SE is performed based on a security level of the secure file update script. If the authentication is successful, in a subsequent step a secure channel session between the OCE and the SE is established. Finally, the plurality of remote management commands is processed to manage a file system on the SE.

The OfflineRFMAgent is an application installed in the SE, and acts as a proxy between an OCE (and respectively the SE issuer managing the OCE) and the SE file system and allows to perform file management operations remotely in a secure manner. An OTA platform is not required to be maintained by the SE issuer, reducing thus the complexity of the infrastructure for remote file management operations. As the same secure file script can be used to perform file management operations at several secure elements (SEs) the SE issuer is provided with a method for updating several SEs in a fast and efficient manner.

In some embodiments of the present invention, the method is carried out using a secure channel communication protocol, in particular a secure channel communication protocol which provides mutual authentication based on a pair of ephemeral keys of the OCE.

Preferably, the secure channel communication protocol used is the SCP11c version, defined in Global Platform Card Technology Specification Amendment F.

Using the SCP11c variant of the Secure Channel Protocol SCP11, allows offline scripting usage, that is, the offline creation of secured command sequences.

In some embodiments, the OfflineRFMAgent receives the secure file update script through a plurality of messages from the OCE, each message comprising one command from the plurality of remote management commands.

In some embodiments of the present invention, performing security level authentication comprises checking whether the security level of the secure file update script is set to AUTHENTICATED.

In some embodiments of the present invention, the method further comprises rejecting the secure file update script, if the security level is not AUTHENTICATED.

This ensures that the authentication security level as requested in the Global Platform Card Technology Specification is guaranteed by the OfflineRFMAgent. In particular, any script to be processed by the OfflineRFMAgent shall preferably be at least sent with security level AUTHENTICATED. Otherwise, it shall be rejected by the OfflineRFMAgent.

In some embodiments of the present invention, the secure file update script comprises at least a PERFORM SECURITY OPERATION command and a MUTUAL AUTHENTICATE command, wherein the PERFORM SECURITY OPERATION command comprises an OCE certificate, and the MUTUAL AUTHENTICATE command comprise an ephemeral public key of the OCE.

This provides a streamlined remote file management solution, as the OfflineRFMAgent does not need to implement the complete SCP11 logic, but only to support the reception and processing of the main SCP11c APDU commands: PERFORM SECURITY OPERATION and MUTUAL AUTHENTICATE. In particular, the PERFORM SECURITY OPERATION command is used to submit the OCE certificate, which contains the public key of the OCE and which is used for key agreement and to determine the level of security required for all the subsequent commands. This is required as a precondition to the initiation of a SCP11c secure channel session. The MUTUAL AUTHENTICATE command is used to send the ephemeral public key of the OCE through the OfflineRFMAgent to the security domain, to trigger the key establishment and to provide card authentication information to the OCE.

Preferably, establishing a secure channel session comprises requesting by the OfflineRFMAgent a security domain (SD) located at an operating system (OS) of the secure element to perform a security operation for verifying the OCE certificate, and preferably, further comprises requesting the security domain to extract the public key from the OCE-certificate and afterwards during the mutual authenticate operation request the SD to perform the Key-Agreement process.

A security domain (SD) is an on-card entity which provides support for the control, security, and communication requirements of an off-card entity. Preferably, the OfflineRFMAgent according to the present invention, is configured to request such a support from the corresponding SD of the secure element (SE).

In particular, the OfflineRFMAgent will forward the PERFORM SECURITY OPERATION and MUTUAL AUTHENTICATE commands to the associated Security Domain through Java Card GlobalPlatform API in order to process the commands.

In some embodiments of the present invention, the secure file update script comprises further a SELECT command, indicating a remote management application for executing the remote management commands on the file system of the secure element during the established secure channel session, and wherein the OfflineRFMAgent handles the SELECT command without closing the established secure channel session.

This prevent the situation usually occurring when using the SELECT command inside of an established session, namely closing the session and thus interrupting any further communication with the SE.

In some embodiments of the present invention, processing the plurality of remote management commands comprises creating and/or updating a content of the file system on the secure element by using a file access application programming interface.

According to a second aspect of the present invention, a remote file management, RFM agent (OfflineRFMAgent), located at a secure element (SE) is provided. The OfflineRFMAgent comprises means for receiving from an off-card entity (OCE) a secure file update script, the secure file update script comprising a plurality of remote management commands for carrying out file management operations on the secure element; means for performing security level authentication of the OCE with the SE based on a security level of the secure file update script; means for establishing a secure channel session between the OCE and the SE if the security level authentication is successful; and means for processing the plurality of remote management commands by calling corresponding methods to manage a file system on the SE.

In some embodiments of the present invention, the OfflineRFMAgent is configured to perform the method according to the first aspect or the method according to any one of the preferred embodiments according to the first aspect.

In some embodiments of the present invention, the OfflineRFMAgent comprises an access domain configuration defining at least one access domain parameter, for controlling an application instance to the file system of the SE, and/or an application provider identifier defining an ownership relation between the OfflineRFMAgent and the secure element, wherein a value of the application provider identifier corresponds to a subject identifier in an OCE certificate used during the authentication process.

This will guarantee to the OfflineRFMAgent the appropriate access to the file system on the SE, in order to run successfully. This avoids the need of verifying a PIN, as usually it is diversified and, therefore, makes not possible to be embedded into DSEM script.

In some embodiments, the OfflineRFMAgent further comprises means for restricting an execution of a set of remote management commands, in particular, the set comprising VERIFY PIN/PUK, CHANGE PIN/PUK, DISABLE PIN/PUK, ENABLE PIN/PUK, and UNBLOCK PIN/PUK.

SCP11c allows the generation of statics scripts built off-line, and it is possible that those scripts can be executed several times. But SCP11c doesn't provide Forward Secrecy as only OCE ephemeral key is used. Any script which include a command to update the PIN/PUK values, will fail successively any times the commands are executed as original PIN/PUK values have been updated. For that reason, some commands are restricted to be executed during SCP11c session. Further, by configuring the OfflineRFMAgent with means for restricting execution of remote management commands, sensitive commands such as PUT KEY or SET STATUS, which are not allowed by the GlobalPlatform Card Specification for the SCP11c protocol can easily be disabled.

In some embodiments of the present invention, the OfflineRFMAgent further comprises an application provider identifier, defining an ownership relation between the OfflineRFMAgent and the secure element, wherein a value of the application provider identifier corresponds to a subject identifier in an OCE certificate used during the authentication process.

This ensures that the necessary security level, in particular the security level AUTHENTICATED, is achieved by the OfflineRFMAgent.

According to a third aspect of the present invention, a decentralized remote file management (DRFM) platform is provided for offline generation of secure file update scripts for a plurality of secure elements (SEs). The platform comprises a memory for storing credentials for off-card entities (OCEs) and a processor for generating secure file update scripts. The processor is configured to receive a file update script from a SE issuer; protect the file update script using credentials stored in the memory, to obtain a secure file update script; and send the secure file update script to the SE issuer.

Preferably, the credentials comprise for each OCE a static OCE key pair and an ephemeral key pair.

Preferably, the secure file update script comprises further a card group ID, identifying a plurality of SEs having same OCE credentials.

The DRFM platform provides means for protecting the script content provided by the SE issuer with the SCP11c keys of the target SEs, however with a much simpler structure than a conventional OTA platform, as only two key pairs of the OCE are used. Further, as the process of protecting the script content is done only once per all the SEs identified by the card group ID, the same secure file update script can be deployed into any of these SEs. In other words, the process of securing the script content will occur only once in case the content is the same for all SEs. Otherwise, if the content is diversified and unique for each SE, the process shall be repeated for each individual content. In the same way, the process of securing the script content shall be repeated for each card group ID defined during SE personalization.

The main functions of the DRFM platform are the storage and management of DSEM (i.e., SCP11c) credentials and offline script preparation. Both functions can be carried out either by a single entity or split between different entities in charge of each function. As DSEM credentials are shared through multiple SEs, and in particular by all SEs with the same card group ID, the key management in this case is much simpler than the traditional key management performed by a Trusted Service Management (TSM). Further, using the card group ID it is possible to define a target group of cards or SEs, where a specific script applies. This can be specifically addressed to MNOs having different profile configurations. In this case, the DRFM platform allows to build a script suitable only for a single profile configuration defined by his card group ID (as per [GPAmdF]). At the same time, the availability to broadcast a script across all the SEs sharing same credentials is supported. This gives a huge flexibility in terms of script processing.

The DRFM platform can be an offline platform which generates on-demand offline scripts based on the input data and the target SE group. Once the script is generated by DRFM platform, it can be delivered to the SE by any means, e.g. through Internet to a smartphone application which will forward it to the SE afterwards.

Specifically, the secure file update script can be delivered to the target SE group via respective OfflineRFMAgents according to the second aspect of this invention. In particular, the OfflineRFMAgent is an application, such as a Java Card application, installed in the SE, which receives and process the secure file update script command by command.

According to a fourth aspect of the present invention, a decentralized remote file management system is provided. The decentralized remote file management system comprises a secure element (SE) issuer; an off-card entity (OCE); the decentralized remote file management, DRFM, platform according to the third aspect of the present invention; and at least one secure element, SE. The SE comprises the OfflineRFMAgent according to the second aspect of the present invention. The SE issuer is configured to obtain a secure file update script, comprising a plurality of remote file management commands, from the DRFM platform, and to deliver the secure file update script to the OCE. The OCE is configured to provide the secure file update script to the at least one SE through the OfflineRFMAgent corresponding to the SE. The OfflineRFMAgent is configured to establish a secure channel session between the OCE and the corresponding SE, and to perform the method according to the first aspects of the present invention, for remote file management (RFM) at the secure element.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skill in the art upon reviewing the following detailed description of preferred embodiments and variants of the present invention in conjunction with the accompanying figures.

BRIEF DESCRIPTION OF THE DRAWINGS

Reference will now be made to the accompanying figures, in which:

FIG. 6 illustrates a sequence diagram of the method for performing remote file management operations according to an embodiment.

DETAILED DESCRIPTION

Figure 1:
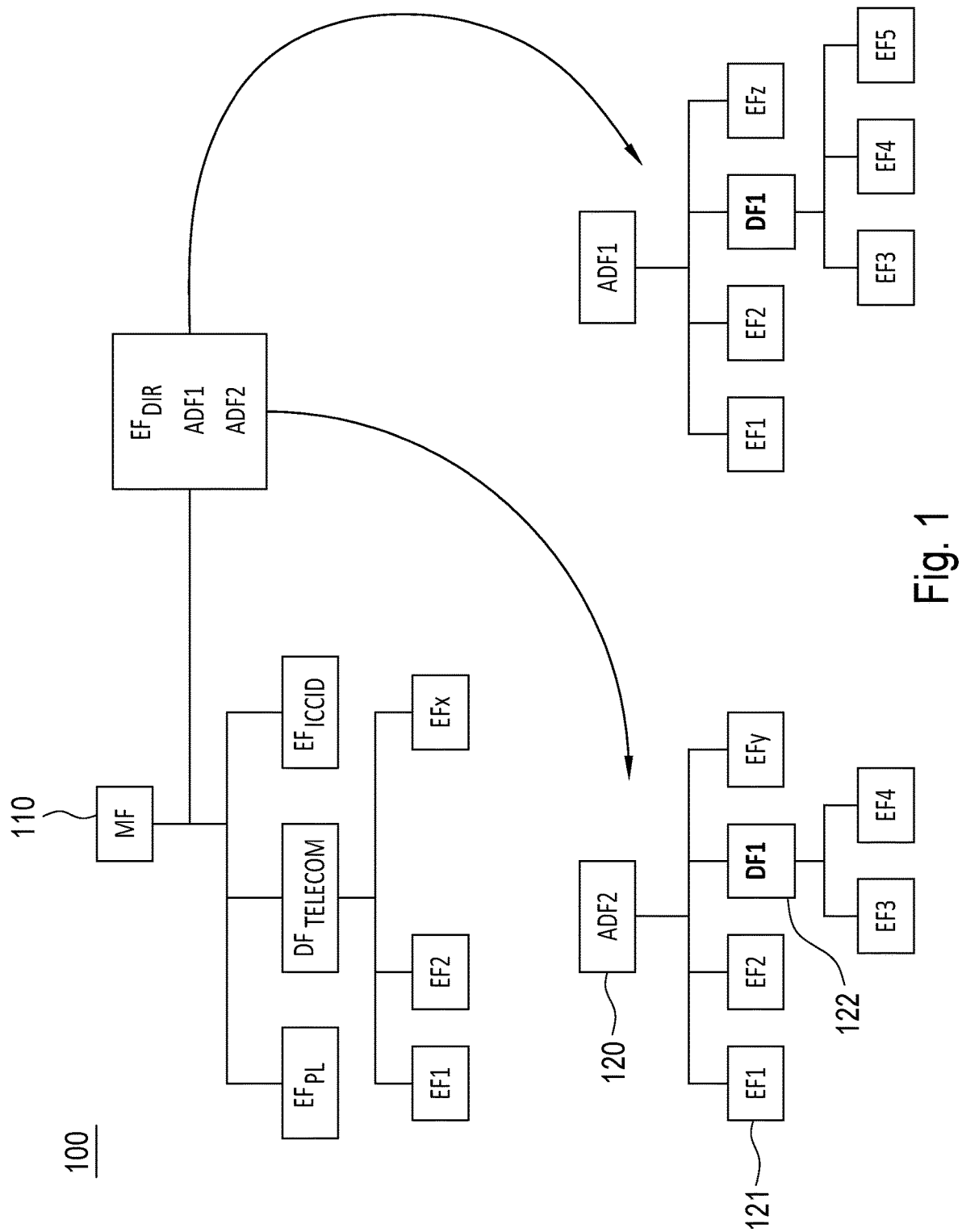
FIG. 1 illustrates an example of a SIM/UICC file system structure.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

TABLE 1

Abbreviations and Notations
Throughout the specification, the following abbreviations and notations are used:

| | |
|---|---|
| ADF | Application Dedicated File |
| AES | Advanced Encryption Standard |
| AID | Application Identifier |
| APDU | Application Protocol Data Unit |
| DES | Data Encryption Standard |
| DF | Dedicated File |
| DRFM | Decentralized Remote File Management |
| DSEM | Decentralized Secure Element Management |
| ECKA | Elliptic Curve Key Agreement |
| EEPROM | Electrically Erasable Programmable Read Only Memory |
| EID | eUICC Identifier |
| eSE | Embedded Secure Element |
| eUICC | Embedded UICC |
| HSM | Hardware Security Module |
| ICCID | Integrated Circuit Card Identifier |
| IMSI | International Mobile Subscriber identity |
| MNO | Mobile Network Operator |
| OCE | Off-Card Entity |
| OS | Operative System |
| OTA | Over-The-Air |
| RAM | Remote Application Management |
| RFM | Remote File Management |
| SCP | Secure Channel Protocol |
| SD | Security Domain |
| SEID | Secure Element Identifier |
| SIM | Subscriber Identity Module |
| TAR | Toolkit Application Reference |
| TSM | Trusted Service Management |
| UICC | Universal Integrated Circuit Card |

Throughout the specification, reference is made to the following standards for smart cards:

TABLE 2

Standards for Smart Cards

| REF | Document | Version | Author |
|---|---|---|---|
| [BSI TR-03111] | BSI Technical Guideline TR-03111: Elliptic Curve Cryptography | V2.0 | BSI |
| [ETSI_102221] | Smart Cards; UICC-Terminal interface; Physical and logical characteristics (Release 11) | V11.1.0 | ETSI |
| [ETSI_102225] | Smart Cards; Secured packet structure for UICC based applications (Release 11) | V11.0.0 | ETSI |
| [ETSI_102226] | Smart Cards; Remote APDU structure for UICC based applications (Release 11) | V11.2.0 | ETSI |
| [ETSI_102241] | Smart Cards; UICC Application Programming Interface (UICC API) for Java Card ™ (Release 11) | V11.1.0 | ETSI |
| [GPCS] | GlobalPlatform Card Technology Card Specification | V2.3.1 | GlobalPlatform |
| [GPAmdF] | GlobalPlatform Technology Secure Channel Protocol '11' Card Specification v2.3 - Amendment F | V1.2 | GlobalPlatform |
| [ISO7816_4] | Identification cards -- Integrated circuit cards -- Part 4: Organization, security and commands for interchange | 2013 | ISO |
| [NIST 800-56A] | Recommendation for Pair-Wise Key-Establishment Schemes Using Discrete Logarithm Cryptography | Revision 2 | NIST |

Figure 2:
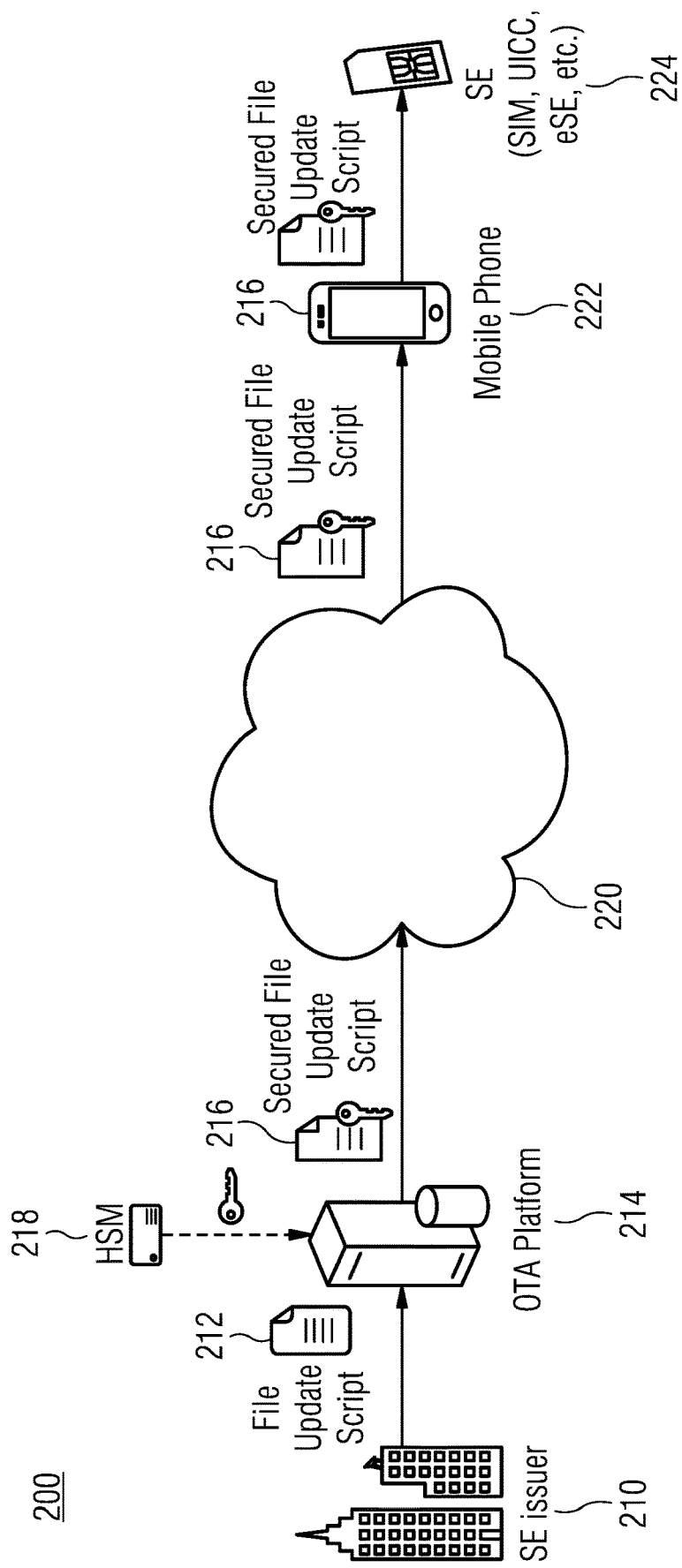
FIG. 2 illustrates an example of an OTA Management System.

FIG. 2 illustrates an example of a conventional OTA management ecosystem 200. An SE issuer 210, which can be an MNO in a telecommunication environment, provides the "File Update Script" 212 to the OTA platform 214. The File Update Script 212 comprises a set of APDU commands for updating a specific file in the SE. The OTA platform 214 prepares an individual "Secure File Update Script" 216 for a particular SE. This is done by protecting the script content as specified in the ETSI 102 225 (Smart Cards; Secured packet structure for UICC based applications) and ETSI 102 226 (Smart Cards; Remote APDU structure for UICC based applications) Standard Specification for Smart Cards, using individual OTA SE keys, which are securely stored in an HSM 218. Finally, the "Secure File Update Script" is transferred through the network 220 to the SE 224 of the mobile device 222. The SE is able to unwrap the script, read and process the ADPU commands contained therein.

The RFM process illustrated in FIG. 2 can only be applied to a single SE. In case several different SEs are to be updated, within a so-called OTA campaign, the SE issuer indicates to the OTA platform which SEs are to be updated, for instance, by using individual SE identifiers or SE keys (e.g., ICCID for SIM/UICCs, EID for eUICCs or SEID for eSE). The OTA platform prepares for each SE a "Secure File Update Script", which is then transferred to the corresponding SE. In other words, the process depicted in FIG. 2 has to be repeated as many times as the number of SEs which are to be updated.

To carry out OTA operations as described above, conventional solutions employ an individual key management system, which implies a huge database that links SE identifiers (e.g. ICCID for SIM/UICCs, EID for eUICCs or SEID for eSE) with HSM key labels in order to securely wrap the OTA script content.

To address the above-identified shortcomings of conventional OTA-based solutions, the present invention introduces a decentralized remote file management platform, a remote file management agent, and a decentralized remote file management system, which allow to perform file management operations remotely in a secure manner by means of a variant of the secure channel protocol, SCP11c.

SCP11c, also called Decentralized Secure Element Management (DSEM), provides mutual authentication between the OCE and the SE, using only static keys for the authentication of the SE which makes this protocol suitable for offline scripting usage. In particular, SCP11c supports offline scripting creation for a group of SEs, as all the calculations can be precomputed in advance and deployed later.

SCP11c is based on Elliptic Curve Key Agreement Algorithm (ECKA). Specifically, it is based in One-Pass Unified Model, C (1e, 2s, ECC CDH) scheme as defined in section 6.2.1.2 of [NIST 800-56A] specification. Following NIST recommendations, the calculated shared secret is not used directly as cryptographic key but as an input for a key derivation process. This scheme uses a single ephemeral key pair instead of two pairs. Only the OCE ephemeral key pair is used in this scheme, while the ephemeral key pair from the SE side is removed, and the SD ECKA key (that is, the static key pair of the SD) is used twice. This allows to precompute the calculated session keys off-line, without needing to know the current state of the SE. Once the session keys are calculated, it is possible to build any script protected and secured with those keys.

Example embodiments of the decentralized remote file management system are described in the following with reference to FIGS. 3 to 6.

Figure 3:
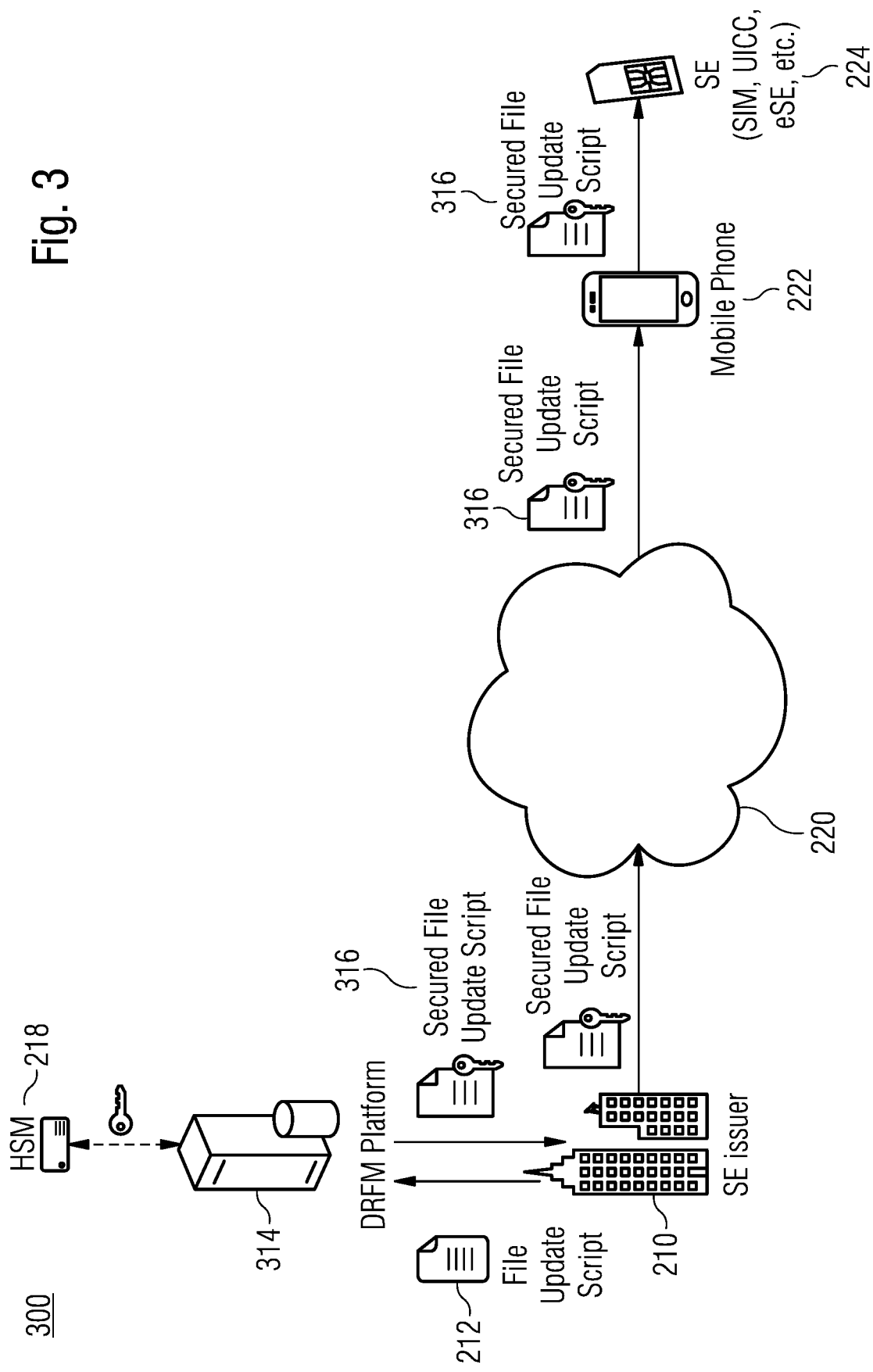
FIG. 3 illustrates an example of a decentralized remote file management system according to an embodiment.

FIG. 3 illustrates the basic operations of the remote file management system according to an embodiment of the present invention.

In the embodiment depicted in FIG. 3, an SE issuer, for example the SE issuer 210 of FIG. 2, provides the "File Update Script" 212 to a DRFM platform 314. The DRFM platform 314 replaces the OTA Platform 214 from the conventional OTA-based solutions as depicted in FIG. 2, and is responsible for protecting the script content provided by the SE issuer 210 with the SCP11c keys of the target SEs 224. As a main difference with the conventional OTA-based approach, this process is done only once per all the SEs, as the same "Secure File Update Script" can be deployed into any SEs.

The DRFM platform 314 performs main functions, including storage and management of DSEM credentials and offline script preparation. Both functions can be carried out either by a single entity of the DRFM platform or split into different entities in charge of each function.

The SCP11 specification [GPAmdF] allows to define a target group of SEs where a specific file update script applies. This might be the case with MNOs having different profile configurations. In this case, it will be possible to build a script suitable only for a single profile configuration defined by its Card Group ID (as per [GPAmdF]). At the same time, the availability to broadcast a script across all the SEs sharing same credentials is possible. As DSEM credentials are shared by all SEs in a Card Group ID, the key management in this case is much more simple than the traditional key management performed by a TSM. This gives a huge flexibility in terms of script processing.

The DRFM platform 314 can be an offline platform which generates on-demand offline scripts based on the input data (e.g. file update script 212) and the target SE group 224. Once the secure file update script 316 is generated by the DRFM 314 platform, it can be delivered to the SE 224 by any means, e.g. through Internet 220 to a smartphone application 222 which will forward it to the SE 224 afterwards.

Figure 4:
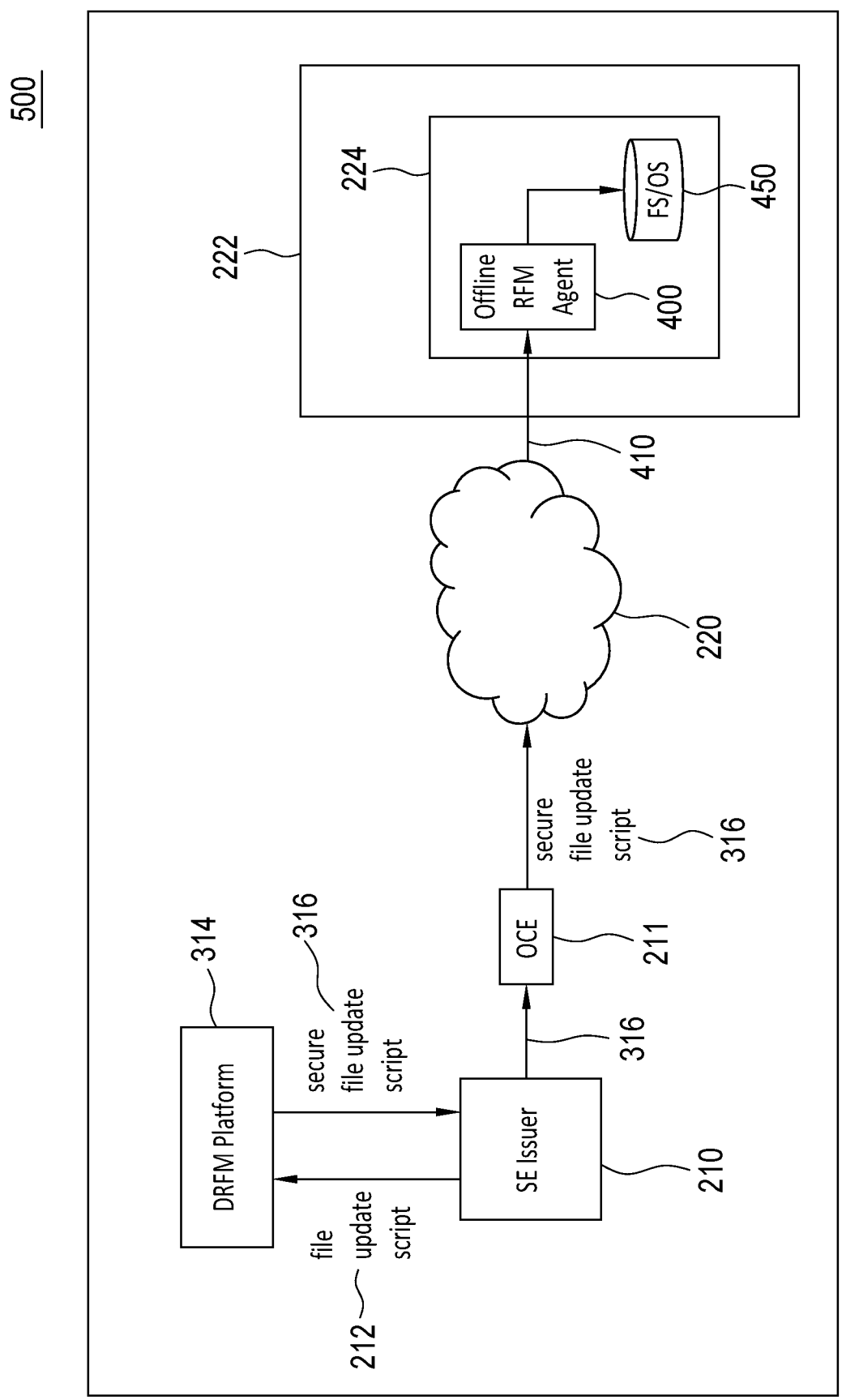
FIG. 4 illustrates an example of a decentralized remote file management system according to another embodiment.

FIG. 4 illustrates a remote file management system 500 according to an embodiment of this invention.

With reference to FIG. 4, the remote file management system 500 comprises an SE issuer 210, a DRFM platform 314, an off-card entity OCE 211, which communicates a secure file update script 316 to a SE 224 of a device 222, through wired or wireless communication means 220. The DRFM platform 314 receives from the SE issuer a file update script 212 and generates the secure file update script 316 as described above with reference to FIG. 3. The secure file update script can be generated offline in advance by the DRFM platform, that is, before the actual task of updating the file systems at the SEs.

The secure file update script 316 comprises a plurality of remote management commands 410 for carrying out file management operations on the secure element (SE) 224. These commands are received one by one at the OfflineRFMAgent 400, located within the SE 224.

The OfflineRFMAgent 400 is contained within the SE 224, and may act as a proxy between an SE issuer 210 and the File System 450 of the SE 224. Preferably, the OfflineRFMAgent 400 is a Java Card™ application.

The secure file update script 316 is sent to the SE with a pre-set authentication security level. The GlobalPlatform Technology Secure Channel Protocol '11' Card Specification defines the authentication security level and assigns AUTHENTICATED security level to the authentication achieved by the owner of the SD. Any script to be processed by the OfflineRFMAgent may be at least sent with security level AUTHENTICATED. Otherwise, it may be rejected by the OfflineRFMAgent.

The OfflineRFMAgent 400 may use the Secure Channel Java Card™ API as defined by GlobalPlatform to establish an SCP11c session between the OCE device application (owned by the SE issuer) and the SE. Secure Channel API defines a basic service used to manage entity authentication and protect APDU commands and responses. It is typically exposed by a Security Domain to its associated Applications. A Security Domain is an on-card entity which provides support for the control, security, and communication requirements of an off-card entity.

Using an instance of this Secure Channel interface requires no knowledge of the underlying protocols, algorithms and secrets used to perform entity authentication and provide integrity and confidentiality of APDU commands and responses, which only need to be known by the provider of the instance. Furthermore, it allows to reuse the current ecosystem and standards in the deployment of the OfflineRFMAgent.

Preferably, the OfflineRFMAgent 400 does not implement the complete SCP11c logic as it can be delegated into its associated Security Domain but may at least support the reception of the main SCP11c APDU commands: PERFORM SECURITY OPERATION and MUTUAL AUTHENTICATE and the appropriate Access Domain configuration. At their reception, the OfflineRFMAgent 400 may forward back and forth the incoming data.

In addition to that, the OfflineRFMAgent 400 may use FileView API defined by ETSI in [ETSI_102241] in order to be able to create and/or update content of the File System 450.

The method executed by the OfflineRFMAgent 400 for performing remote file management operations on the File System 450 of a secure element (SE) will be illustrated in the following with reference to FIG. 5, which illustrates the basic steps, and to FIG. 6, which provides implementation details according to preferred embodiments.

Figure 5:
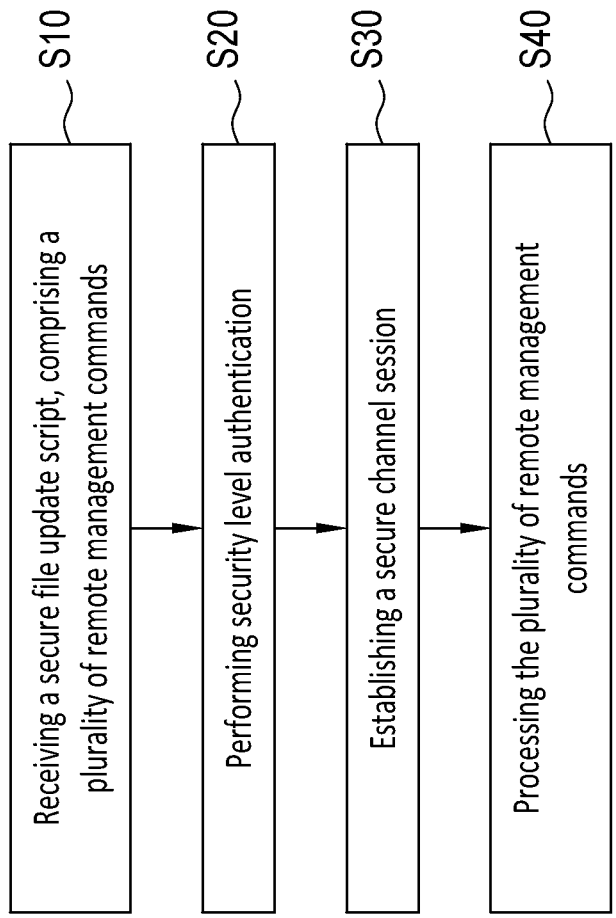
FIG. 5 illustrates a method for performing remote file management operations according to an embodiment.

With reference to FIG. 5, upon receiving in a first step S10 a secure file update script from the OCE 211, the OfflineRFMAgent 400 performs in step S20 security level authentication of the OCE 211 with the SE 224 based on a security level of the secure file update script, for authenticating the ownership of the received script. As described above with reference to FIG. 4, any script to be processed by the OfflineRFMAgent is sent by the OCE with security level AUTHENTICATED. Any other scripts, sent with a different security authentication levels will be rejected by the OfflineRFMAgent 400.

Preferably, if SCP11 related operations are directly managed by OfflineRFMAgent, Application Provider Identifier shall be configured within the applet. Otherwise, if the SD is responsible for managing the SCP11 operations, Application Provider Identifier shall be configured in the Security Domain where the OfflineRFMAgent is installed.

In step S30, the OfflineRFMAgent 400 establishes, if the security level authentication is successful, a secure channel session between the off-card entity OCE 211 and the secure element SE 224.

After the secure channel session has been established, the OfflineRFMAgent 400 processes in step S40 the plurality of remote management commands comprised within the secure file update script, and which were received one-by-one from the OCE 211, to remotely manage the file system 450 on the secure element 224.

Preferred implementations for steps S30 and S40 will be described with reference to FIG. 6, which shows a sequence diagram for decentralized remote file management, by message passing between the various components of the ecosystem of FIGS. 3 and 4.

As illustrated in FIG. 6, the OfflineRFMAgent 400 receives from the OCE 211 a plurality of APDU commands contained in the secure file update script 316. The secure file update script 316 may comprise several APDU commands, including, but not limited to, SELECT, PERFORM SECURITY OPERATION, and MUTUAL AUTHENTICATE. In the embodiment depicted in FIG. 6, these commands are sent to the OfflineRFMAgent 400 by the OCE 211 one-by-one and processed one-by-one upon their arrival at the OfflineRFMAgent.

The secure file update script comprises a SELECT command 421 for indicating the ID (OfflineRFMAgent AID) of the application (or file) to be managed at the SE (e.g., updated, deleted).

Upon performing security level authentication as per step S20 in FIG. 5, the OfflineRFMAgent 400 acknowledge 431 the received messages by sending back to the OCE 420, the so-called Status Word (SW) which is an acknowledgment which indicates the command processing status as defined in ISO 7816-4.

As stated with reference to FIG. 5, in step S30, the OfflineRFMAgent 400 establishes a secure channel session between the off-card entity OCE 211 and the secure element SE 224. This step can be implemented by (1) performing a security operation, followed by (2) performing mutual authentication.

Performing a security operation is initiated at the OfflineRFMAgent 400 by receiving from the OCE 211 the PERFORM SECURITY OPERATION command, 422. This command can be used by the OCE to submit an OCE certificate, which comprises the public key of the OCE.

Preferably, the OfflineRFMAgent 400 requests 432 a security domain of the operating system, OS, 450 of the secure element 224 to perform above security operation for verifying the OCE-certificate and to extract the public key from the OCE certificate and store the public key. In this case, the OfflineRFMAgent 400 may receive a response 451 from the OS 450.

After receiving 422 the PERFORM SECURITY OPERATION command, the OfflineRFMAgent 400, sends a response together with an acknowledgment (Status Word), 433, to the OCE 211. The response message may indicate whether the security operation was successful or not and, if applicable, one or more error conditions.

The MUTUAL AUTHENTICATION command 423 is used to transfer the ephemeral key of the OCE 211 to the SE 224 and may further contain flavor authentication information for the SD. The SE will complete the key agreement between OCE keys and SD key and return back to the OCE the receipt of the key agreement result.

The OfflineRFMAgent 400 delegates 434 to the OS 450 the operation of mutual authentication, and upon receiving a response 452 from the OS, forwards 435 the response together with a Status Word (SW) to the OCE. The Status Word (SW) is an acknowledgment which indicates the command processing status as defined in ISO 7816-4. In particular, the Status Word will depend on the status of the authentication. If the authentication was successfully achieved, SW=9000 will be issued by the SE to the OCE. Otherwise, a different SW indicating the specific error will be sent back to the OCE. In addition, the SD public key and the receipt may be returned. The OCE may check the receipt value to confirm the same value is calculated at his side.

The OfflineRFMAgent 400 may delegate both security and mutual authentication to be performed to its associated security domain by calling SecureChannel.processSecurity (APDU), 432, 434.

The above-described steps of PERFORM SECURITY OPERATION and MUTUAL AUTHENTICATION commands to complete the establishment of a secure channel session in step S30 of FIG. 5.

Once the secure channel session is established, the OfflineRFMAgent may continue with step S40, as depicted in FIG. 5, to process the plurality of remote management commands received from the OCE. In particular, with reference to FIG. 6, the OfflineRFMAgent 400 calls SecureChannel.unwrap(APDU), 436, in order to process and verify the secure messaging of the incoming APDU command according to the security level of the current secure channel session. The security level of the current secure channel session is preferably set to the security level indicated in the MUTUAL AUTHENTICATE command, which was received at the OfflineRFMAgent in step 423.

Once the security has been processed, the OfflineRFMAgent 400 may process the file management APDU command itself and can call the pertinent File View method, 437, 440, in order to create, delete, search or update the file system content. Preferably, the OfflineRFMAgent sends after processing the security (in step 456) and/or after performing remote file management operations at the SE (in step 457) a response message to the OCE 441.

Table 3 gives an overview over APDU commands the OfflineRFMAgent may support to carry out remote file management operations, as defined in [ETSI_102226]. Some restriction may apply on certain commands, as will be described below in connection with TABLE 4.

TABLE 3

| APDU commands |
| Commands supported |
| --- |
| SELECT |
| UPDATE BINARY |
| UPDATE RECORD |
| SEARCH RECORD |
| INCREASE |
| VERIFY PIN |
| CHANGE PIN |
| DISABLE PIN |
| ENABLE PIN |
| UNBLOCK PIN |
| DEACTIVATE FILE |
| ACTIVATE FILE |
| READ BINARY |
| READ RECORD |
| CREATE FILE |
| DELETE FILE |
| RESIZE FILE |
| SET DATA |
| RETRIEVE DATA |

As per to [GPAmdF] specs, any attempt to use SELECT APDU inside of SCP11c session is allowed but it causes a termination of the already opened secure channel session. On traditional OTA RFM sessions, the RFM application is implicitly selected by Toolkit Application Reference (TAR) included as part of the OTA command, therefore there is no requirement to select any application.

To prevent the situation described above that causes the closure of secure channel session when a SELECT command is sent to select any file in the file system during RFM scripting, the OfflineRFMAgent 400 can be configured to handle any SELECT command embedded in SCP11c script without closing the secure channel session.

Preferably, the OfflineRFMAgent is configured with the Access Domain parameter as defined in [ETSI_102221] and [ETSI_102226], which indicates the mechanism used to control the application instance access to the File System, that is, the access rights granted to the application.

This will guarantee to the OfflineRFMAgent the appropriate access to the file system in order to run successfully. This avoids the need of verifying a PIN, as usually it is diversified and, therefore, makes not possible to be embedded into DSEM script.

Preferably, the OfflineRFMAgent 400 further comprises means for restricting an execution of a set of remote management commands. In particular, the OfflineRFMAgent can be configured to restrict the usage of the commands from [ETSI_102226] listed in table 4 below.

TABLE 4

| APDU commands not allowed |
| Commands NOT allowed |
| --- |
| VERIFY PIN |
| CHANGE PIN |
| DISABLE PIN |
| ENABLE PIN |
| UNBLOCK PIN |

This restriction supports the Session Replay requirements defined in connection with the SCP11c protocol. SCP11c allows the generation of statics scripts built off-line, it is possible that those scripts can be executed several times. For that reason, some commands are restricted to be executed during SCP11c session like PUT KEY and SET STATUS commands. The OfflineRFMAgent can be configured to restrict the usage of certain commands from [ETSI_102226].

Preferably, the OfflineRFMAgent is configured to fulfill further restrictions defined in the SPC11c protocol specification [GPAmdF].

The above embodiments of the present invention provide several advantages due to the enablement of the SCP11c variant into the Remote File Management ecosystem. The proposed solution simplifies the existing SE file management by reusing existing APIs and architecture of the GlobalPlatform standard. In particular:

Offline Scripting:

RFM scripts can be created and deployed without the need of an active online connection with an OTA Platform. As the session keys can be pre-calculated in advance, it is possible to build any script without the need of any response from the SE.

Broadcast/Multicast Scripting:

It allows the possibility to deploy the same secured RFM script into all SEs of a batch or a specific subset based on the Card Group ID.

High Security Solution:

RFM scripts will be protected using latest standards and specifications. Every command is protected with a SCP11c credentials, guaranteeing thus E2E encrypted communications. Therefore, no one other than the owner of the credentials has access to the script and no one is able to modify or alter it in any manner. In addition, credentials are securely stored in SD of SEs.

Inline of Current Standards:

The solution provided by the present invention re-uses the current standards in order to minimize the impact in already existing deployments for File System management.

Not specific infrastructure required:

In fact, Offline Scripting for Remote File Management solution tries to simplify the integration and deployment requirements to improve the time to market and the associated cost.

On top of that, it is noticeable that the economic costs of the overall solution are significantly lower than the existing solution as OTA Platform complexity is reduced considerably.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for performing remote file management operations at a secure element by an offline remote file management agent, the method comprising:
   receiving by the offline remote file management agent of the secure element a secure file update script from an off-card entity,
   the offline remote file management agent being located within the secure element,
   the secure file update script being transmitted to a target group that includes a plurality of secure elements of a respective plurality of mobile devices,
   the secure file update script being usable by each of the plurality of secure elements of the target group to perform file management operations,
   the secure file update script comprising a plurality of remote management commands for carrying out file management operations on the secure element including updating a directory and/or files of the secure element and/or managing applications on the secure element;
   performing by the offline remote file management agent located within the secure element a security level authentication of the off-card entity with the secure element based on a security level of the secure file update script;
   establishing by the offline remote file management agent located within the secure element a secure channel session between the off-card entity and the secure element in a case that the security level authentication is successful; and
   processing by the offline remote file management agent located within the secure element the plurality of remote management commands to manage a file system on the secure element, wherein said processing the plurality of remote management commands comprises creating and/or updating a content of the file system on the secure element by using a file access application programming interface.

2. The method according to claim 1, wherein the method is carried out using a secure channel communication protocol that provides mutual authentication based on a pair of ephemeral keys of the off-card entity.

3. The method according to claim 1, wherein the offline remote file management agent receives the secure file update script through a plurality of messages from the off-card entity, each of the plurality of message comprising one command from the plurality of remote management commands.

4. The method according to claim 1, wherein said performing security level authentication comprises checking whether the security level of the secure file update script is set to AUTHENTICATED.

5. The method according to claim 4, wherein the method further comprises rejecting the secure file update script in a case that the security level is not AUTHENTICATED.

6. The method according to claim 1, wherein the secure file update script comprises a PERFORM SECURITY OPERATION command and a MUTUAL AUTHENTICATE command, wherein the PERFORM SECURITY OPERATION command comprises an off-card entity certificate and the MUTUAL AUTHENTICATE command comprise an ephemeral public key of the off-card entity.

7. The method according to claim 6, wherein said establishing the secure channel session comprises requesting a security domain located at an operating system of the secure element to perform a security operation for verifying the off-card entity certificate.

8. The method according to claim 6, wherein said establishing the secure channel session comprises requesting a security domain located at an operating system of the secure element to perform a security operation for verifying the off-card entity certificate and, further comprises requesting the security domain to extract the public key from the off-card entity certificate and to perform a mutual authenticate operation.

9. The method according to claim 1,
   wherein the secure file update script further comprises a SELECT command indicating a remote management application for executing the plurality of remote management commands on the file system of the secure element during the established secure channel session, and wherein the offline remote file management agent handles the SELECT command without closing the established secure channel session.

10. The method according to claim 1, wherein the secure file update script is broadcast and multicast to each of the plurality of secure elements of the target group.

11. The method according to claim 1, wherein the plurality of secure elements of the target group share the same credentials.

12. The method according to claim 1, wherein the secure file update script comprises a card group ID identifying the plurality of secure elements of the target group having same off-card entity credentials.

13. The method according to claim 1, wherein the secure file update script comprises a plurality of remote management commands for carrying out file management operations on the secure element including updating a directory of the secure element.

14. The method according to claim 1, wherein the secure file update script comprises a plurality of remote management commands for carrying out file management operations on the secure element including updating files of the secure element.

15. The method according to claim 1, wherein the secure file update script comprises a plurality of remote management commands for carrying out file management operations on the secure element including managing applications on the secure element.

16. A computer program product stored on a storage device, the computer program product including an offline remote file management agent, the offline remote file management agent comprising:
   means for receiving a secure file update from an off-card entity,
   the offline remote file management agent being configured to be located within the secure element,
   the secure file update script being transmitted to a target group that includes a plurality of secure elements of a respective plurality of mobile devices,
   the secure file update script being usable by each of the plurality of secure elements of the target group to perform file management operations, and
   the secure file update script comprising a plurality of remote management commands for carrying out file management operations on the secure element including updating a directory and/or files of the secure element and/or managing applications on the secure element;
   means for performing a security level authentication of the off-card entity with the secure element based on a security level of the secure file update script;
   means for establishing a secure channel session between the off-card entity and the secure element in a case that the security level authentication is successful;
   means for processing the plurality of remote management commands by calling corresponding methods to manage a file system on the secure element, wherein said processing the plurality of remote management commands comprises creating and/or updating a content of the file system on the secure element by using a file access application programming interface.

17. The offline remote file management agent according to claim 16, wherein
   the offline remote file management agent is configured to receive the secure file update script through a plurality of messages from the off-card entity, each of the plurality of messages comprising one command from the plurality of remote management commands and
   wherein the offline remote file management agent receives the secure file update script through a plurality of messages from the off-card entity, each of the plurality of message comprising one command from the plurality of remote management commands.

18. The offline remote file management agent according to claim 16, further comprising means for restricting an execution of a set of remote management commands, the set of remote management commands comprising VERIFY PIN, CHANGE PIN, DISABLE PIN, ENABLE PIN, and UNBLOCK PIN.

19. The offline remote file management agent according to claim 16, further comprising an access domain configuration defining at least one access domain parameter, for controlling an application instance to the file system of the secure element, and/or an application provider identifier defining an ownership relation between the offline remote file management agent and the secure element, wherein a value of the application provider identifier corresponds to a subject identifier in an OCE certificate used during the authentication process.

20. A remote file management system comprising:
   a secure element that includes one or more processors and a memory storage configured to store one or more files; and
   an offline remote file management agent located within the secure element, wherein the offline remote file management agent located within the secure element is configured to:
   receive a secure file update script from an off-card entity,
   the secure file update script being transmitted to a target group that includes a plurality of secure elements of a respective plurality of mobile devices,
   the secure file update script being usable by each of the plurality of secure elements of the target group to perform file management operations,
   the secure file update script comprising a plurality of remote management commands for carrying out file management operations on the secure element including updating a directory and/or files of the secure element and/or managing applications on the secure element;
   perform a security level authentication of the off-card entity with the secure element based on a security level of the secure file update script;
   establish a secure channel session between the off-card entity and the secure element in a case that the security level authentication is successful; and
   process the plurality of remote management commands to manage a file system on the secure element, wherein said processing the plurality of remote management commands comprises creating and/or updating a content of the file system on the secure element by using a file access application programming interface.

* * * * *